Jan. 28, 1969   S. EKSTROM ET AL   3,424,972

DEVICE FOR TRANSMITTING CONTROL PULSES TO A RECTIFIER

Filed Sept. 9, 1966

INVENTOR.
STAFFAN EKSTRÖM; LINDY YNGVESSON
BY
Bailey, Stephens + Huettig
ATTORNEYS

United States Patent Office 3,424,972
Patented Jan. 28, 1969

3,424,972
DEVICE FOR TRANSMITTING CONTROL PULSES TO A RECTIFIER
Staffan Ekstrom and Lindy Yngvesson, Ludvika, Sweden, assignors to Allmänna Svenska Elektriska Aktiebolaget, Vasteras, Sweden, a Swedish corporation
Filed Sept. 9, 1966, Ser. No. 578,239
Claims priority, application Sweden, Sept. 9, 1965, 11,756/65
U.S. Cl. 321—38                                   7 Claims
Int. Cl. H02m 7/46, 7/70

ABSTRACT OF THE DISCLOSURE

Control pulse transmission device for transmitting control pulses of a certain length from a control pulse generator to the control electrode of a rectifier. Said transmission device comprises an impulse transformer and a second transformer, each transformer having a primary winding, a secondary winding and a biasing winding. The primary winding of the impulse transformer is connected to said pulse generator; the secondary winding of the impulse transformer is connected to the control electrode of an extinguishable thyristor connected in series with the primary winding of the second transformer and a voltage source; the secondary winding of said second transformer is connected to the control electrode of said rectifier.

The present invention relates to a device for transmitting control pulses to a rectifier in a converter and the device is constructed with the help of an extinguishable thyristor. The rectifier may be a mercury arc rectifier, a so-called ionic rectifier, or it may be formed of a number of series-connected thyristors.

The device is particularly suitable for control pulse transmission by means of light pulse transmission, for example with the help of so-called photodiodes and some form of photocell arrangement. With this form of control pulse transmission a high power amplification is necessary and with a device according to the invention such a power amplification is obtained and also high output power with a relatively small number of components in the connection. An advantage with an arrangement according to the invention is also that it contains no capacitive elements, but only resistive and inductive elements, so that distortion of the pulses transmitted is avoided.

The invention is based on the use of a premagnetized pulse transformer which is saturated and a device according to the invention is characterized in that the last step of the transmission contains an extinguishable thyristor, the control circuit of which comprises a premagnetized pulse transformer, the primary winding of which is fed by control pulses having the desired length and such an effect in relation to the pulse transformer that this becomes saturated within a fraction of the control pulse, and the secondary winding of which is connected to the control electrode of an extinguishable thyristor. In this way an ignition pulse for the extinguishable thyristor will be induced in the secondary winding of the transformer at the start of an input pulse, while an extinguishing pulse is induced in the secondary winding when the input pulse ceases. At the same time the cathode-control electrode-circuit of the extinguishable thyristor will operate as a Zener diode in the secondary circuit of the pulse transformer so that a natural remagnetization voltage for the pulse transformer is obtained.

Figure 1:
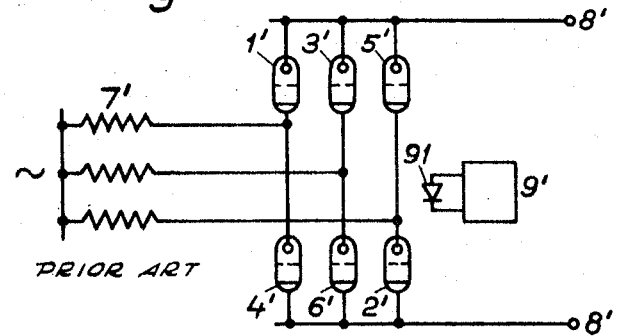
Figure 2:
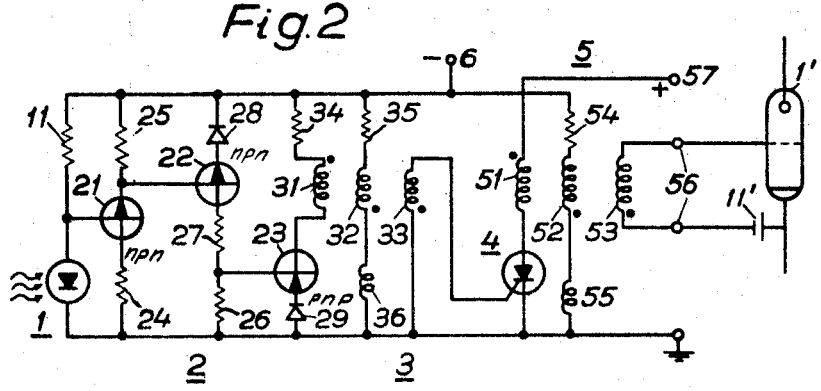
Figure 3:
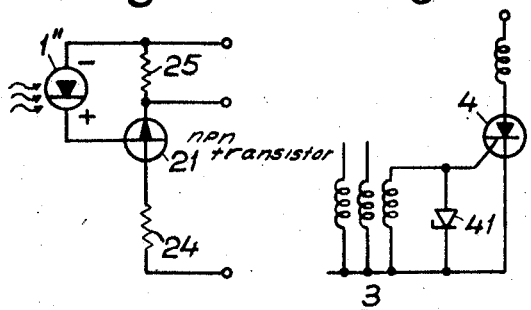
Figure 4:
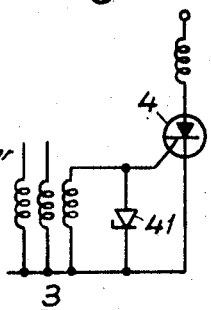
Figure 5:
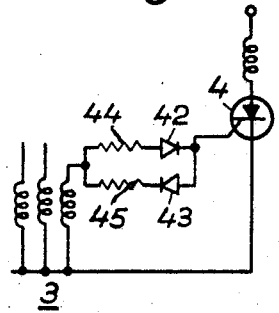

The invention will be more fully described with reference to the accompanying drawing where FIGURE 1 shows a conventional converter, while FIGURE 2 shows a device according to the invention for transmitting control pulses to the rectifiers in such a converter. FIGURE 3 shows a variation of the light-sensitive input step for the arrangement according to FIGURE 2, while FIGURES 4 and 5 show different connections between the pulse transformer in the device according to FIGURE 2 and the control circuit for the extinguishable thyristor in this device.

FIGURE 1 shows a converter of conventional type comprising a rectifier bridge with 6 rectifiers 1–6' and a 3-phase converter transformer, only the rectifier winding 7' of which has been shown. Further, the converter is provided with DC terminals 8' and a control pulse generator 9' for the rectifiers. From the control pulse generator 9' control pulses are transmitted to the rectifiers 1'–6', usually 120° in length, that is, equal to the normal conducting interval of the rectifiers with the help of photodiodes, only one of which 91 has been shown.

The light pulses from the photodiode are received in the device in FIGURE 2 with the help of a detector in the form of a light-sensitive diode 1 which in FIGURE 2 operates as a photoconductive element. The diode 1 forms the initial step for a 3-stage transistor amplifier 2 comprising three transistors 21, 22 and 23. The transistor amplifier is connected between earth and a negative voltage source 6 and when the diode 1 receives light, it will become conducting in its blocking direction, whereby a current will flow through this diode and the resistor 11 and in the base-emitter circuit for the transistor 21 and the resistor 25. Thus a current will flow through the resistor 24 and the now conducting transistor 21 and further through the base-emitter circuit of the transistor 22 which will thus become conducting. A current will then flow through the voltage divider 26–27 and due to the voltage drop across the resistor 26 a current will flow through the emitter-base circuit of the transistor 23 which will therefore become conducting. The diodes 28 and 29 are connected in the circuit in such a way that their forward voltage drop will prevent the transistor amplifier becoming conducting due to leakage currents in the transistors. When the transistor 23 becomes conducting a current will flow through the primary winding 31 in the pulse transformer 3, which primary current is limited by the resistor 34. In fact the output circuit of the control device 9' in FIGURE 1 could have been connected directly to the primary side 31 of the pulse transformer 3, for example with the help of an insulating transformer, but with transmission by means of light pulses the problems with the high insulating level of such insulating transformers are avoided. The primary winding 31 in the pulse transformer counteracts a bias winding 32 in series with a smoothing reactor 36 and a current limiting resistor 35. The bias winding 32 is suitably so dimensioned that the pulse transformer is saturated in one direction. Further, the primary winding 31 is so dimensioned that when the primary current starts to flow the pulse transformer will very soon be saturated in the opposite direction, thus inducing a voltage pulse in the secondary winding 33, which voltage pulse ignites the extinguishable thyristor 4.

When the thyristor 4 becomes conducting, a current will arise in the primary winding 51 of a grid voltage transformer 5. The primary current is driven from a positive voltage source 57 and the primary winding 51 counteracts a bias winding 52 which, through a smoothing reactor 55 and a current-limiting resistor 54, is connected to the negative voltage source 6. The current in the primary winding 51 will induce in the secondary winding 53 a voltage which is connected to the grid circuit of the corresponding mercury arc rectifier, for example 1' in the rectifier connection in FIGURE 1.

When the light pulse to the diode 1 ceases this diode will be blocked and therefore also the entire transistor amplifier 2, whereby the primary current in the winding 31 of the pulse transformer 3 ceases. The pulse transformer 3 will therefore be remagnetized by the bias current in the winding 32, whereby a new voltage pulse is induced in the secondary winding 33 which pulse is directed opposite to the first pulse and thus extinguishes the thyristor 4. The circuit cathode-control electrode in this thyristor will therefore operate as a Zener diode in the secondary circuit of the pulse transformer, whereby a suitable remagnetized voltage in the winding 33 is obtained. When the thyristor 4 is blocked the current in the winding 51 ceases and the grid voltage transformer 5 is remagnetized due to the current in the bias winding 52. Thus a negative voltage is induced in the secondary winding 53 which, together with the negative bias grid voltage 11' in the mercury arc rectifier 1' causes deionization of the rectifier 1'.

In both the transformer 3 and 5 the magnetic flux due to the current in the primary winding is counterdirected to the flux due to the current in the bias-winding. Thus an increasing current as well as a decreasing current in the primary winding causes a voltage to be induced in the secondary winding. As the transformer 3 is a saturable impulse transformer, the voltages induced in the secondary winding will have the character of pulses in one or the other direction. The transformer 5, however, is not saturated so that the voltages induced in its secondary winding will have the same duration as the increasing and decreasing currents, respectively, in the primary winding.

Each of the mercury arc rectifiers in FIGURE 1 may be replaced by a suitable number of series-connected thyristors; such a thyristor chain is suitably formed by a number of thyristors controlled by the control pulses generator 9', while the rest of the thyristors are provided with some form of slave-ignition. For such a converter the transmission means in FIGURE 2 is designed with a number of secondary windings 53 connected each to one of the thyristors in the rectifier in question which is to be controlled directly by the control pulse generator 9'. The method of operation and the construction of the device in FIGURE 2 will, however, remain unchanged.

Instead of the photoconductive element 1 in FIGURE 2 it is possible to use a so-called photovoltage element which generates a voltage when it is subjected to light. Such a photovoltage element 1" has been shown inserted in FIGURE 3 between the base and emitter of the transistor 21.

To limit the control voltage of the thyristor 4 a Zener diode 41 can be inserted as shown in FIGURE 4. At ignition the forward voltage drop of the Zener diode is sufficient to ensure ignition of the thyristor and in the reverse direction a lower value is obtained for the voltage across the control circuit of the thyristor.

In FIGURE 5 has been shown how it is possible to separate ignition and extinguishing currents in the thyristor 4 with the help of two reverse-parallel connected diodes 42, 43 in series with respective resistors 44, 45. Normally an extinguishable thyristor has lower ignition current than extinguishing current which means that disturbances in the form of voltage pulses of low energy might ignite a thyristor without then being able to extinguish it. By choosing the resistor 44 suitably high in relation to the resistor 45 such a disturbance phenomenon can be eliminated.

It is clear that the different variations shown in FIGURES 2-5 may be arbitrarily combined within the scope of the invention.

We claim:

1. A static converter comprising a plurality of controlled rectifiers each provided with a control electrode; a control pulse generator for said rectifiers; said control pulse generator generating control pulses of a certain length; the length of said control pulse being substantially equal to the desired conducting intervals of the corresponding rectifiers;
   means for transmitting said control pulses from said pulse generator to said rectifiers' control electrodes; said transmitting means comprising for each said rectifier:
   a premagnetized pulse transformer having at least a primary and a secondary winding; said primary winding supplied by said pulse generator wherein the magnitude of said control pulses is so great as compared to said pulse transformer's premagnetized condition that said pulse transformer is rendered saturated within a fraction of the length of said control pulses;
   an extinguishable thyristor and a grid voltage transformer;
   said grid voltage transformer having at least a primary and a secondary winding; said secondary winding of said grid voltage transformer being connected with a respective control electrode of said rectifiers;
   a direct voltage source; the primary winding of said grid voltage transformer being connected to said direct voltage source through said extinguishable thyristor; and
   said secondary winding of said pulse transformer being connected to the control electrode of said extinguishable thyristor.

2. A static converter as claimed in claim 1; an amplifier inserted between said control pulse generator and said pulse transformer.

3. A static converter as claimed in claim 2; a photoelectric transmission between said control pulse generator and said amplifier.

4. A static converter as claimed in claim 1; said pulse transformer being premagnetized so that it is saturated.

5. A static converter as claimed in claim 1; said grid voltage transformer being premagnetized.

6. A static converter as claimed in claim 1; a Zener diode between the control electrode and the cathode of said extinguishable thyristor and in parallel with the secondary winding of said pulse transformer.

7. A static converter as claimed in claim 1; two reverse-parallel connected diodes between the secondary winding of said pulse transformer and the control electrode of said extinguishable thyristor; resistors; each of said diodes being connected in series with one of said resistors; said resistors being dimensioned in accordance with the desired ignition and extinguishing control currents, respectively, for said thyristor.

References Cited

UNITED STATES PATENTS

| 3,263,125 | 7/1966 | Genuit | 315—224 X |
| 3,297,911 | 1/1967 | Quinn | 315—220 X |
| 3,218,541 | 11/1965 | Ainsworth | 321—38 |
| 3,223,922 | 12/1965 | Borden | 323—22 |
| 3,311,784 | 3/1967 | Cassanova | 321—38 X |
| 3,317,789 | 5/1967 | Nuckolls | 323—22 X |
| 3,333,178 | 7/1967 | Van Allen et al. | 321—38 |

JOHN F. COUCH, *Primary Examiner.*

G. GOLDBERG, *Assistant Examiner.*

U.S. Cl. X.R.

307—252; 315—157, 220, 354; 323—20, 22